(12) United States Patent
Anderson

(10) Patent No.: US 11,964,749 B2
(45) Date of Patent: *Apr. 23, 2024

(54) ACTIVE VALVE FOR THROTTLING ASCENT RATE

(71) Applicant: Aerostar International, LLC, Columbia, MD (US)

(72) Inventor: Kevin Anderson, Sunnyvale, CA (US)

(73) Assignee: Aerostar International, LLC (CO)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,981

(22) Filed: Feb. 28, 2022

(65) Prior Publication Data
US 2023/0391439 A1 Dec. 7, 2023

Related U.S. Application Data

(63) Continuation of application No. 16/012,146, filed on Jun. 19, 2018, now Pat. No. 11,260,950.

(51) Int. Cl.
*B64B 1/64* (2006.01)
*B64B 1/40* (2006.01)
(Continued)

(52) U.S. Cl.
CPC .................. *B64B 1/64* (2013.01); *B64B 1/40* (2013.01); *B64C 39/024* (2013.01);
(Continued)

(58) Field of Classification Search
CPC .... B64B 1/64; B64B 1/62; B64B 1/60; B64B 1/44; F16K 31/042; B64U 10/30
See application file for complete search history.

(56) References Cited

U.S. PATENT DOCUMENTS 4,500,066 A  2/1985 Trassl
4,655,100 A  4/1987 Frederick
(Continued)

FOREIGN PATENT DOCUMENTS

KR    20160024328 A      3/2016
WO    WO-2019245963 A1   12/2019
WO    WO-2019246087 A1   12/2019

OTHER PUBLICATIONS

"U.S. Appl. No. 16/709,219, Non-Final Office Action dated Jun. 9, 2022", 13 pgs.
(Continued)

*Primary Examiner* — Richard Green
(74) *Attorney, Agent, or Firm* — Kim and Lahey Law Firm, LLC; Douglas W. Kim

(57) ABSTRACT

A valve assembly for use with an unmanned aerial vehicle is provided and includes an inlet tube, a shuttle, a base plate, a screw assembly, and a spacer block. The shuttle is partially disposed within the inlet tube and is configured to be placed in a first position where the shuttle abuts the inlet tube and a second position where the outer surface is disposed in spaced relation to the inlet tube. The base plate extends between a first end portion that defines a cavity therein and a second end portion. The screw assembly is disposed within the cavity of the base plate and is coupled to a portion of the shuttle. The spacer block is interposed between the second end portion of the inlet tube and the first end portion of the base plate and is configured to maintain the inlet tube and the base plate in spaced relation.

1 Claim, 9 Drawing Sheets

(51) Int. Cl.
*B64C 39/02* (2023.01)
*F16K 31/04* (2006.01)
*G05D 1/00* (2006.01)
*G05D 1/04* (2006.01)
*B64U 10/30* (2023.01)

(52) U.S. Cl.
CPC ........... *F16K 31/042* (2013.01); *G05D 1/042* (2013.01); *B64U 10/30* (2023.01)

(56) References Cited

U.S. PATENT DOCUMENTS

| | | |
|---|---|---|
| 4,690,120 A | 9/1987 | Egle |
| 5,333,817 A | 8/1994 | Kalisz et al. |
| 8,814,084 B2 | 8/2014 | Shenhar |
| 8,998,128 B2 | 4/2015 | Ratner |
| 9,174,720 B1 | 11/2015 | Ratner |
| 9,534,504 B1 | 1/2017 | Gartner |
| 11,260,950 B2 | 3/2022 | Anderson |
| 2003/0116204 A1 | 6/2003 | Volovets et al. |
| 2008/0196770 A1 | 8/2008 | Ruckel et al. |
| 2014/0353424 A1 | 12/2014 | Ratner |
| 2015/0336653 A1 | 11/2015 | Anderson et al. |
| 2019/0382094 A1 | 12/2019 | Anderson |
| 2020/0115024 A1 | 4/2020 | Anderson et al. |

OTHER PUBLICATIONS

"U.S. Appl. No. 16/012,146, Examiner Interview Summary dated Mar. 26, 2021", 2 pgs.
"U.S. Appl. No. 16/012,146, Final Office Action dated Mar. 17, 2021", 12 pgs.
"U.S. Appl. No. 16/012,146, Non Final Office Action dated Sep. 28, 2020", 13 pgs.
"U.S. Appl. No. 16/012,146, Notice of Allowance dated Apr. 22, 2021", 9 pgs.
"U.S. Appl. No. 16/012,146, Notice of Allowance dated Oct. 20, 2021", 7 pgs.
"U.S. Appl. No. 16/012,146, Response filed Mar. 30, 2021 to Final Office Action dated Mar. 17, 2021", 8 pgs.
"U.S. Appl. No. 16/012,146, Response filed Dec. 11, 2020 to Non Final Office Action dated Sep. 28, 2020", 11 pgs.
"International Application Serial No. PCT/US2019/037473, International Preliminary Report on Patentability dated Dec. 30, 2020", 10 pgs.
"International Application Serial No. PCT/US2019/037473, International Search Report dated Oct. 1, 2019", 3 pgs.
"International Application Serial No. PCT/US2019/037473, Written Opinion dated Oct. 1, 2019", 8 pgs.
"International Application Serial No. PCT/US2019/037717, International Preliminary Report on Patentability dated Dec. 30, 2020", 13 pgs.
"International Application Serial No. PCT/US2019/037717, International Search Report dated Oct. 15, 2019", 3 pgs.
"International Application Serial No. PCT/US2019/037717, Written Opinion dated Oct. 15, 2019", 11 pgs.

ACTIVE VALVE FOR THROTTLING ASCENT RATE

BACKGROUND

Technical Field

The present disclosure relates to controlling the flight of aerial vehicles, and more particularly, to altitude control systems utilizing active valve systems to control the flight path of aerial vehicles.

Background of Related Art

Unmanned aerial vehicles, such as balloons, may operate at substantial altitudes. In certain instances, such vehicles operate within the Earth's stratosphere, having favorably low windspeeds at an altitude between 18 and 25 km (11-15 mi). The dynamics of the stratosphere are such that the windspeed and wind direction varies at certain altitudes, which allows unmanned vehicles to rely on the windspeed and wind direction alone for navigation, without the need for additional propulsion means. In this manner, an unmanned vehicle simply needs to increase or decrease its altitude to change course or to increase its speed.

As can be appreciated, various means may be employed to adjust the altitude of the unmanned vehicle, such as ballast in the form of air. Increasing or decreasing the amount of ballast present in the unmanned vehicle causes the unmanned vehicle to ascend or descend. However, pressure variations and aerodynamic drag acting on the unmanned vehicle as it ascends or descends can impact the ability to control the unmanned vehicle and impact the durability of various components of the unmanned vehicle as it descends or ascends. The present disclosure seeks to address the shortcomings of prior altitude control systems.

SUMMARY

The present disclosure is directed to a valve assembly for use with an unmanned aerial vehicle and includes an inlet tube extending between first and second end portions, a shuttle partially disposed within the inlet tube, wherein the shuttle is configured to be placed in a first position where an outer surface of the shuttle abuts a portion of the inlet tube and a second position where the outer surface of the shuttle is disposed in spaced relation to the inlet tube, a baseplate extending between first and second end portions, the first portion of the base plate defining a cavity therein, a screw assembly disposed within the cavity of the base plate, wherein a portion of the screw assembly is coupled to a portion of the shuttle, and a spacer block interposed between the second end portion of the inlet tube and the first end portion of the base plate, the spacer block configured to maintain the inlet tube and the base plate in spaced relation to one another.

In aspects, the shuttle may include a seal disposed on the outer surface thereof, the seal configured to abut a portion of the inlet tube.

In certain aspects, the outer surface of the shuttle may define an annular groove therein that is configured to receive a portion of the seal therein.

In other aspects, the screw assembly may include a screw extending between a first end portion and a second opposite end portion, wherein an outer surface of the screw defines a plurality of threads, and a support bearing assembly configured to threadably engage the plurality of threads of the screw such that the screw is rotatably and translatably supported therein.

In certain aspects, the valve assembly may include a motor coupled to a portion of the base plate, wherein the motor is in mechanical communication with a portion of the screw.

In other aspects, the valve assembly may include a motor housing defining a first end portion and a second, opposite end portion, the first end portion defining a cavity therein that is configured to receive a portion of the motor therein, wherein the motor housing is releasably coupled to the base plate.

In aspects, the second end portion of the inlet tube may define a flared configuration.

In certain aspects, the shuttle may define a conical configuration, the outer surface of the shuttle extending between a first end portion defining a tip and a second, opposite end portion defining a planar configuration.

In other aspects, the shuttle may define a frusto-conical configuration, the outer surface of the shuttle extending between a first end portion defining a blunt tip and a second, opposite end portion defining a planar configuration.

In certain aspects, the outer surface of the shuttle may include a fin disposed therein and extending therefrom.

In other aspects, the fin may be disposed adjacent the tip of the first end portion of the shuttle.

According to another aspect of the present disclosure, a method of controlling an altitude of an unmanned aerial vehicle is provided and includes translating a shuttle of a valve assembly from a first, closed portion where an outer portion of the shuttle abuts a portion of an inlet tube of the valve assembly, to a second, open position where the outer portion of the shuttle is placed in spaced relation relative to the inlet tube to permit fluid to enter the inlet tube, causing an impeller of an altitude control system to rotate in a first direction to draw air through the inlet tube of the valve assembly and into an interior portion of a ballonet that is disposed within an interior portion of a balloon, wherein the impeller is disposed downstream of the valve assembly, and adjusting the position of the shuttle relative to the inlet tube to adjust the amount of fluid permitted to be drawn into the inlet tube, wherein adjusting the amount of fluid permitted to be drawn into the inlet tube adjusts the descent rate of the balloon.

In aspects, translating the shuttle may include causing a motor associated with the valve assembly to rotate in a first direction to cause a corresponding rotation of a screw of a screw assembly coupled to the motor, wherein the screw is threadably engaged to the shuttle such that rotation of the screw in the first direction causes the shuttle to translation from the first, closed position, to the second, open position.

In certain aspects, translating the shuttle may include translating the shuttle from the first, closed position where a seal is disposed on an outer portion of the shuttle abuts a portion of the inlet tube, to the second, open position where the seal of the shuttle is placed in spaced relation relative to the inlet tube to permit fluid to enter the inlet tube.

In other aspects, translating the shuttle may include translating the shuttle from the first, closed position where an outer portion of the shuttle defining a conical configuration abuts a portion of the inlet tube of the valve assembly to the second, open position where the outer portion of the shuttle is placed in spaced relation relative to the inlet tube to permit fluid to enter the inlet tube.

In accordance with yet another aspect of the present disclosure, an unmanned aerial vehicle is provided and includes a balloon configured to retain a lifting gas therein, the balloon including a ballonet disposed therein that is configured to retain a ballasting gas therein, and an altitude control system including a diffuser coupled to a portion of the balloon and in fluid communication with the ballonet and a valve assembly coupled to a portion of the diffuser and in fluid communication with the diffuser, the valve assembly including an inlet tube extending between first and second end portions, a shuttle partially disposed within the inlet tube, wherein the shuttle is configured to be placed in a first position where an outer surface of the shuttle abuts a portion of the inlet tube and a second position where the outer surface of the shuttle is disposed in spaced relation to the inlet tube, a baseplate extending between first and second end portions, the first portion of the base plate defining a cavity therein, a screw assembly disposed within the cavity of the base plate, wherein a portion of the screw assembly is coupled to a portion of the shuttle, and a spacer block interposed between the second end portion of the inlet tube and the first end portion of the base plate, the spacer block configured to maintain the inlet tube and the base plate in spaced relation to one another.

In aspects, the diffuser may include an impeller rotatably disposed therein that is configured to draw air through a portion of the valve assembly and into an interior portion of the ballonet.

In certain aspects, the shuttle may include a seal disposed on the outer surface thereof, the seal configured to abut a portion of the inlet tube.

In other aspects, the outer surface of the shuttle may define an annular groove therein that is configured to receive a portion of the seal therein.

In certain aspects, the shuttle may define a conical configuration, the outer surface of the shuttle extending between a first end portion defining a tip and a second, opposite end portion defining a planar configuration.

BRIEF DESCRIPTION OF THE DRAWINGS

Various aspects and features of the present disclosure are described hereinbelow with reference to the drawings, wherein.

DETAILED DESCRIPTION

Figure 1:
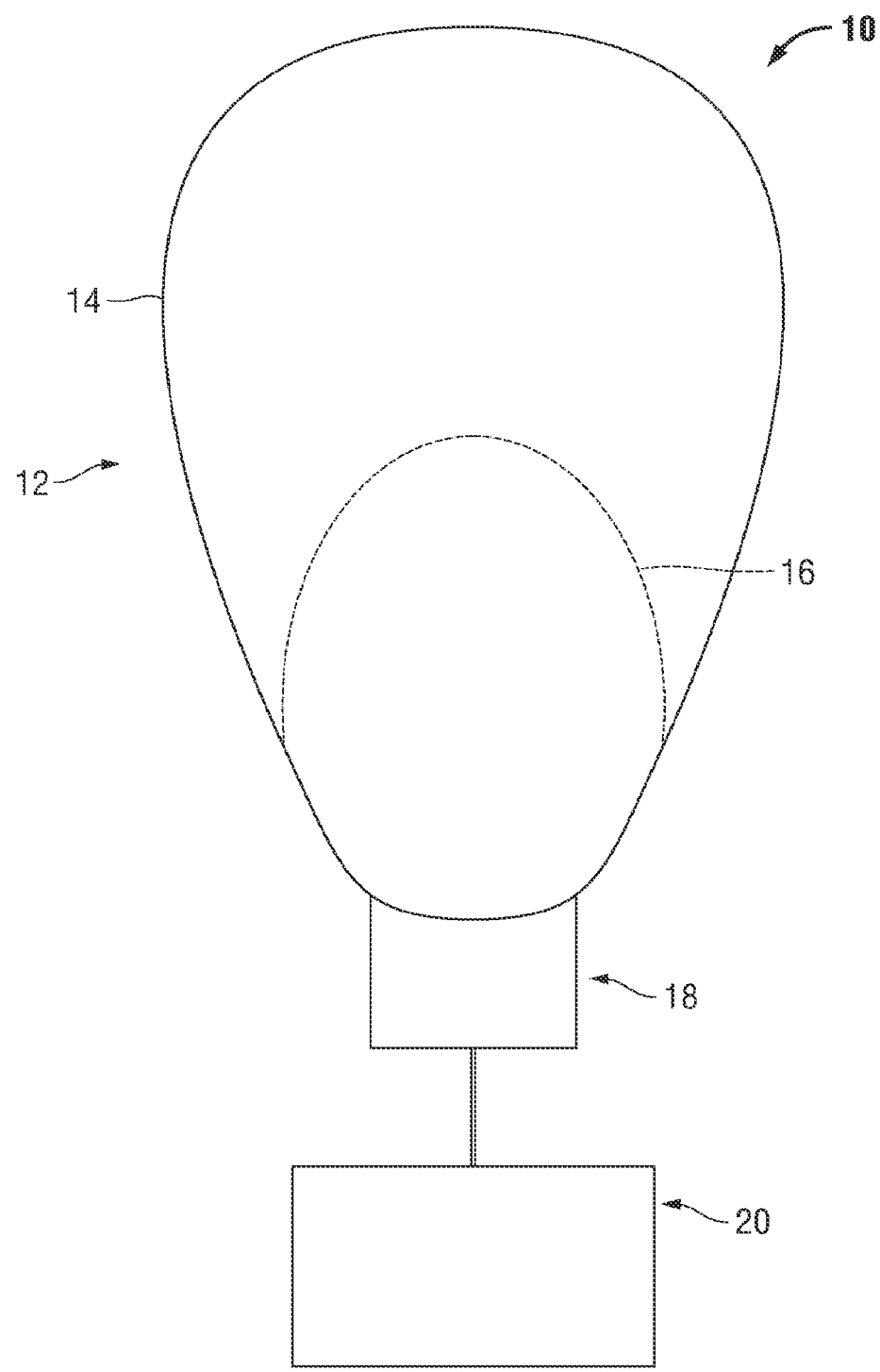
FIG. 1 is an elevation view of an unmanned aerial vehicle provided in accordance with the present disclosure.
Figure 2:
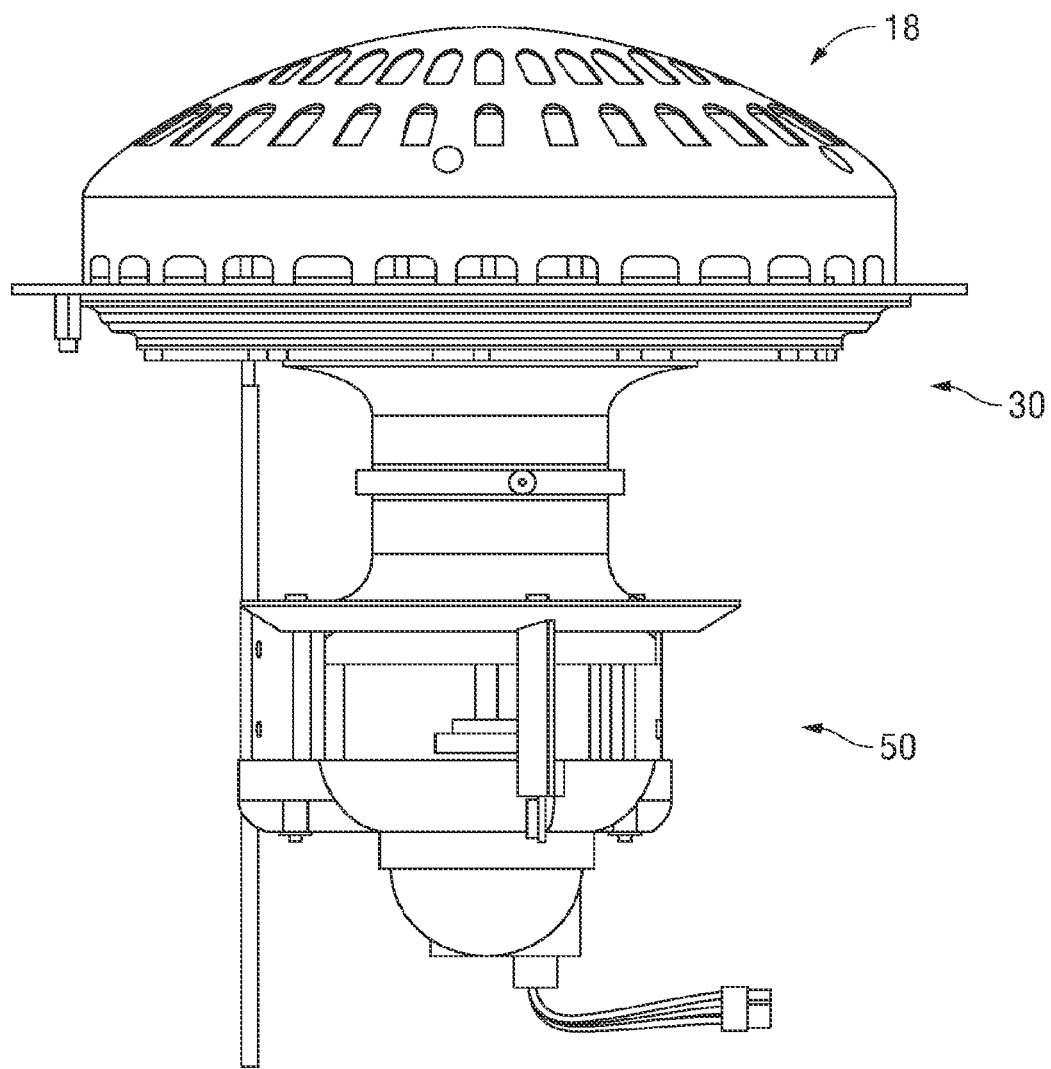
FIG. 2 is an elevation view of an altitude control system of the unmanned vehicle of FIG. 1.
Figure 3:
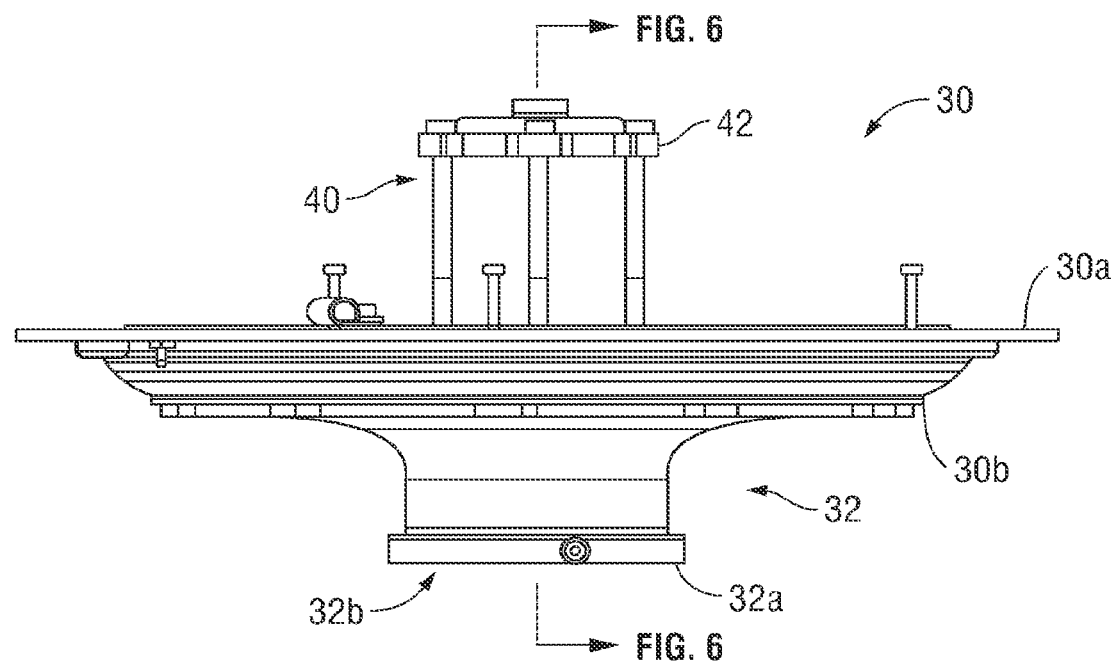
FIG. 3 is an elevation view of a diffuser of the altitude control system of FIG. 2.
Figure 4:
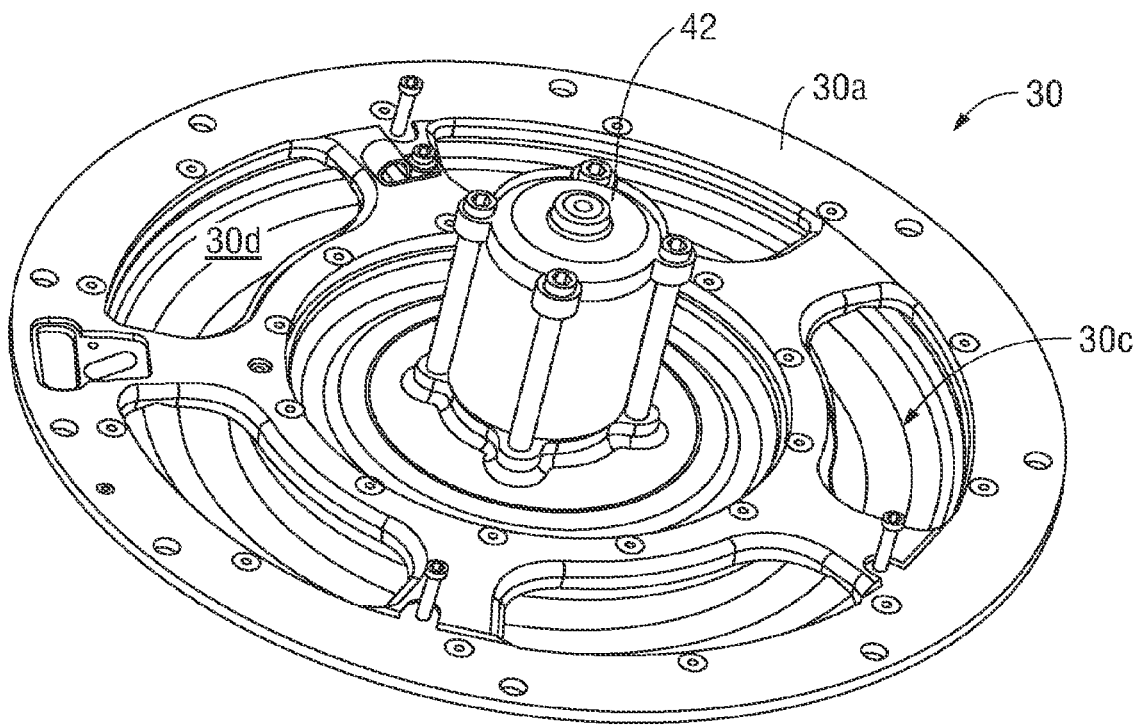
FIG. 4 is a top, perspective view of the diffuser of FIG. 3.
Figure 5:
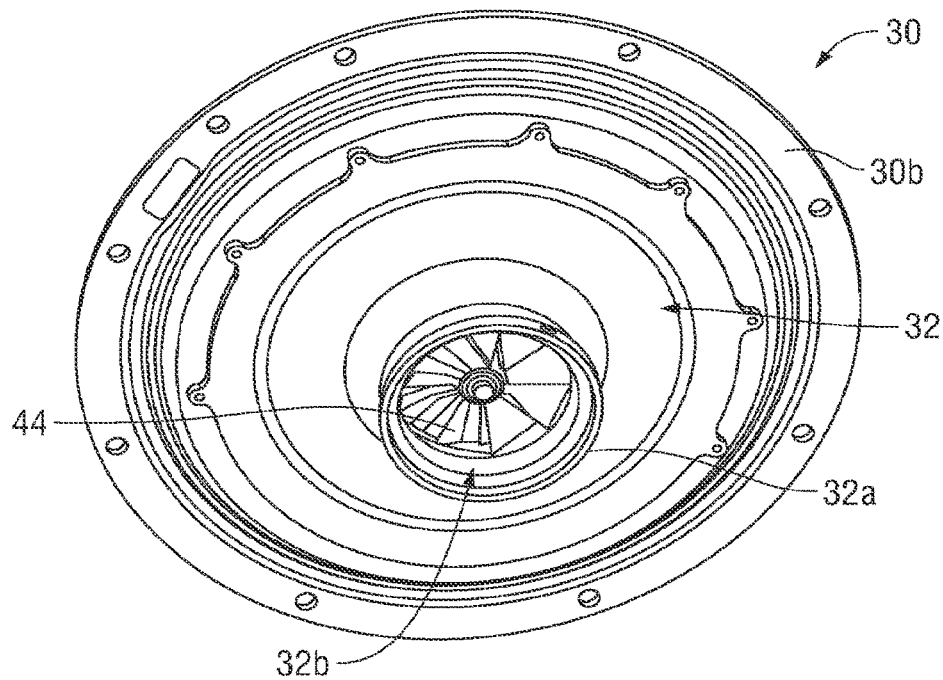
FIG. 5 is a bottom, perspective view of the diffuser of FIG. 3.
Figure 6:
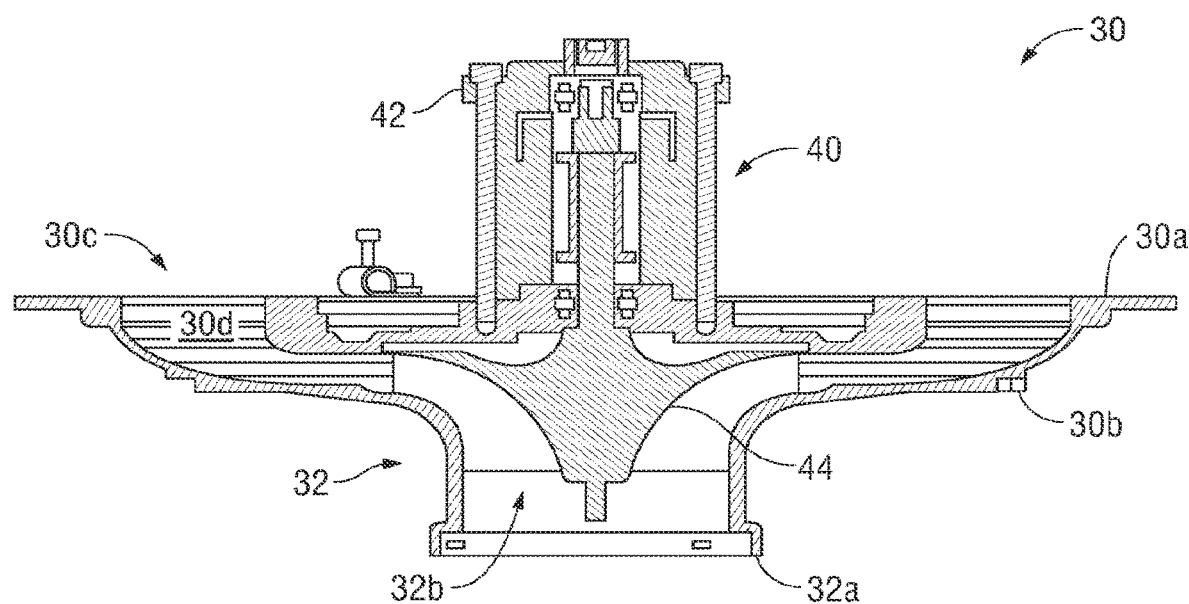
FIG. 6 is a cross-sectional view of the diffuser of FIG. 3 taken along section-line FIG. 6-FIG. 6 of FIG. 3.
Figure 7:
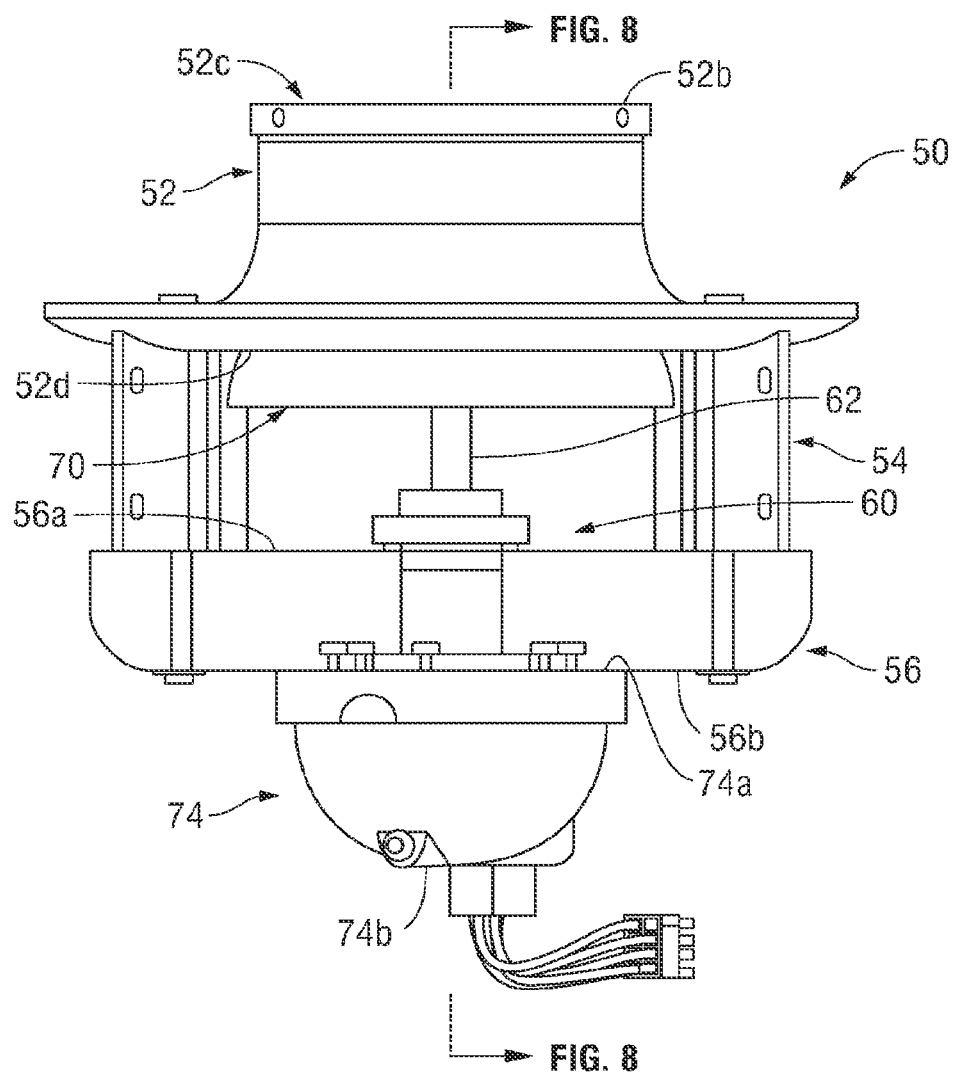
FIG. 7 is an elevation view of a valve assembly of the altitude control system of FIG. 2.

The present disclosure is directed to unmanned aerial vehicles utilizing active valve systems to control the rate of ascent and descent of the unmanned vehicle. The unmanned aerial vehicle includes a balloon having an envelope and a ballonet disposed therein, an altitude control system, and a payload. The altitude control system includes a diffuser and a valve assembly that is coupled to the diffuser and configured to permit air to flow into and out of the ballonet to vary the rate of ascent or descent of the unmanned vehicle. In this manner, the diffuser is coupled to the balloon and includes a compressor that is configured to draw air into the ballonet to increase the density of the balloon. The valve assembly is coupled to the diffuser upstream of the compressor and is configured to vary the amount of air that is permitted to be drawn into the ballonet by the compressor during descent and vary the amount of air that is permitted to be released from the ballonet during ascent. Placing the valve assembly upstream of the compressor mitigates stagnation of air passing through the valve assembly, turbulence, waste heat, and results in lower surge thresholds for the compressor. This is accomplished by enabling lower static and dynamic pressures and in turn, lowers velocities since mechanical work has not yet been performed on the air entering the valve assembly.

The valve assembly includes an inlet tube that is couplable to the diffuser and includes a swaged or flared inlet (e.g., a bellmouth) referred to people skilled in the art as a bellmouth inlet). The valve assembly also includes a base plate that is maintained in spaced relation to the inlet tube by a spacer block. The base plate includes a motor coupled to a portion thereof and a screw assembly that is rotatably supported thereon. The screw assembly includes a screw that is rotatably supported on the base plate and is mechanically coupled to the motor such that rotation of the motor causes a corresponding rotation of the screw. A valvecap is coupled to the screw such that rotation of the screw causes translation of the valvecap relative to the inlet tube and the base plate. The valvecap defines a conical profile extending between a pointed first end and a generally planar second end. The outer surface of the valvecap includes a seal disposed thereon that is configured to abut a portion of the inlet tube to inhibit air from entering or exiting the ballonet. The conical profile of the valvecap encourages laminar air flow into the inlet tube, and thereafter, the compressor to increase the efficiency of the compressor.

The motor is configured to adjust the position of the valvecap relative to the inlet tube to maximize efficiency of the compressor, thereby reducing the amount of energy required to steer the unmanned aerial vehicle. In this manner, the motor causes the valvecap to translate along the screw from a first, closed position where the seal abuts a portion of the inlet tube, to an open position located at any point between the inlet tube and the base plate. As can be appreciated, the motor can continually adjust the location of the valvecap to increase or decrease the amount of air that is permitted to enter or exit the ballonet. By adjusting the amount of air that is permitted to enter or exit the ballonet, the descent rate and ascent rate can match the aerodynamic drag acting upon the balloon, thereby reducing stress on the balloon which is more efficient and extends the life of the balloon.

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

Turning now to the drawings, FIG. 1 illustrates an unmanned aerial vehicle provided in accordance with the present disclosure generally identified by reference numeral 10. The unmanned aerial vehicle 10 includes a high altitude balloon 12 having an envelope 14 and a ballonet 16, an altitude control system 18, and a payload 20. In embodiments, the unmanned aerial vehicle 10 may include one or more cut-down systems (not shown) interposed between the altitude control system 18 and the payload 20.

Although generally illustrated as having a prolate spheroid profile, it is contemplated that the envelope 14 of the balloon 12 may define any suitable profile, such as spheroid or oblate spheroid, among others. It is contemplated that the envelope 14 of the balloon 12 may be formed from any suitable material, an in embodiments, may be formed from metalized MYLAR*, biaxially-oriented polyethylene terephthalate (BoPet), nylon, polyethylene, or at least partially from a highly-flexible latex material or a rubber material such as chloroprene. As can be appreciated, the materials, profile, and/or size of the envelope 14 may vary depending upon the particular needs of the application. The envelope 14 is filled with a lifting gas or other fluid capable of providing lift, such as helium, hydrogen, a helium-hydrogen mixture, or other suitable fluids or mixtures being lighter than air.

Continuing with FIG. 1, the bladder or ballonet 16 of the balloon 12 is disposed within the envelope 14 and is in open communication with the altitude control system 18, as will be described in further detail hereinbelow. The ballonet 16 is configured to be selectively inflated or deflated with a ballasting gas or other fluid that is heavier than the lifting gas disposed within the envelope 14. As can be appreciated, the mass of ballasting gas contained within the ballonet 16 affects the buoyancy of the balloon 12. In this manner, increasing the mass of ballasting gas within the ballonet 16 causes the unmanned vehicle 10 to descend in altitude, whereas decreasing the mass of ballasting gas within the ballonet 16 causes the unmanned vehicle 10 to ascend in altitude. Although generally described as having one ballonet 16, it is contemplated that the balloon 12 may include any number of ballonets 16 depending upon the design needs of the unmanned vehicle 10.

For a detailed description of exemplary balloons capable of being utilized with the altitude control systems disclosed herein, reference may be made to commonly owned U.S. patent application Ser. No. 15/622,119 titled "Electrolysis Systems and Methods for Life Extension of an Apparatus Such as a Balloon." to Sergey Vichik et al., filed Jun. 14, 2017, the entire content of which is hereby incorporated by reference herein.

With reference to FIGS. 1-12, to effectuate the change in mass within the ballonet 16 of the balloon 12, the altitude control system 18 includes a diffuser 30 and a valve assembly 50 selectively coupled to a portion of the diffuser, as will be described in further detail hereinbelow. The diffuser 30 includes an upper surface 30a and an opposite, lower surface 30b and may define any suitable shape, such as a cone, cylinder, amongst others. An intake 32 is disposed on the lower surface 30b and extends therefrom and terminating at an end portion 32a. The end portion 32a of the intake 32 defines a channel 32b therein that is configured to receive a portion of an impeller therein, as will be described in further detail hereinbelow. The upper surface 30a of the diffuser 30 defines a plurality of slots 30c therein that is in fluid communication with a plenum or cavity 30d defined within an interior portion of the diffuser 30. In this manner, the plurality of slots 30c fluidly couples the interior of the ballonet 16 of the balloon 12 to the plenum 30d, and therefore the channel 32b of the intake 32. As can be appreciated, the plurality of slots 30c, the plenum 30d, and the channel 32b cooperate to fluidly couple the interior of the ballonet 16 to the environment outside of the ballonet 16 (e.g., air or other fluids may freely flow through into and out of the ballonet 16 of the balloon 12). As will be described in further detail hereinbelow, control of this flow into and out of the ballonet 16 of the balloon 12 controls the buoyancy of the balloon 12.

The diffuser 30 includes a compressor 40 having a motor 42 and an impeller 44 mechanically coupled to the motor 42. The compressor 40 is selectively coupled to the upper surface 30a of the diffuser 30 such that the impeller 44 is disposed within a portion of the channel 32b of the intake 32 and a portion of the plenum 30d. In embodiments, it is contemplated that the impeller 44 may be disposed entirely or within a portion the channel 32b of the intake 32 or entirely or within a portion of the plenum 30d, depending upon the design needs of the diffuser 30.

The impeller 44 is configured to be rotated in a first direction by the motor 42 to draw air or fluid from the environment surrounding the diffuser into the channel 32b of the intake 32, through the plurality of plenums 30c, and into the ballonet 16 of the balloon 12 to increase the mass of air or fluid therewithin. As can be appreciated, the impeller may be coupled to the motor using any suitable means, such as a collet, coupling, lock-nut (e.g., "Jesus Nut"), amongst others. To decrease the mass of air or fluid within the ballonet 16, the motor 42 remains stationary to enable air or fluid from the ballonet 16 to flow through the plenum 30d and out of the channel 32b of the intake 32 into the surrounding environment. In embodiments, the motor 42 may cause the impeller 44 to rotate in a second, opposite direction to draw air or fluid from the ballonet 16, through the plenum 30d, and out of the channel 32b of the intake 32 into the surrounding environment. As can be appreciated, a suitable valve assembly may be used to control the flow of air or fluid through the intake 32, as will be described in further detail hereinbelow. It is contemplated that any suitable means of controlling the motor 42 may be employed.

As can be appreciated, the various components of the diffuser 30 may be formed from any suitable material suitable for use in high altitude conditions, such as metallic materials (e.g., steel, aluminum, magnesium, and/or the like), non-metallic materials (e.g., polymers, ceramics, composites, and/or the like), among others or any combination thereof, depending upon the design needs of the diffuser 30.

For a detailed description of exemplary control systems for controlling the motor 42, and thereby the compressor 40, reference may be made to commonly owned U.S. patent application Ser. No. 15/662,940 titled "Systems and Methods for Controlling Aerial Vehicles." to Candido et al., filed on Jul. 28, 2017, commonly owned U.S. Pat. No. 9,534,504 to Gartner, titled "Hans Bell Housing for Inflating and Deflating a Balloon Envelope," and commonly owned U.S. Pat. No. 8,998,128 to Ratner, titled "Umbrella Valves to Inflate Bladder in Balloon Envelope," the entire content of each of which is hereby incorporated by reference herein.

With reference to FIGS. 7-12, the valve assembly 50 includes an inlet tube 52, a spacer block 54, a base plate 56, a motor 58, a screw assembly 60, and a shuttle or valvecap 70. The inlet tube 52 defines a generally cylindrical profile having a flared or swaged portion (e.g., a bellmouth profile) at lower portion 52a thereof, although it is contemplated that any suitable profile may be utilized. The inlet tube 52 defines an opposite, upper portion 52b that is configured to be selectively coupled to the end portion 32a of the intake 32 of the diffuser 30. The lower and upper portions 52a, 52b of the inlet tube 52 define a bore 52c therethrough defining a profile that generally coincides with the profile of the inlet tube 52, although any suitable profile may be utilized depending upon the design needs of the valve assembly 50. In this manner, an upper portion of the bore 52c defines a generally circular profile and a lower portion of the bore 52c defines a flared or swaged portion 52d (e.g., a bellmouth profile) extending radially outward.

The spacer block or stanchion 54 defines a generally rectangular profile extending between opposed upper and lower end portions 54a and 54b, respectively. The upper end portion 54a of the spacer block 54 is configured to be selectively coupled to the lower portion 52a of the inlet tube 52 and the lower end portion 54b of the spacer block 54 is configured to be selectively coupled to an upper portion of the base plate 56, such that the spacer block 54 maintains the inlet tube 52 and the base plate 56 in spaced relation. Although generally illustrated as having three spacer blocks 54, it is contemplated that the valve assembly 50 may include any suitable number of spacer block 54, depending upon the design needs of the valve assembly 50. It is contemplated that the spacer block 54 may be coupled to the inlet tube 52 and the base plate 56 using any suitable means, such as fasteners, welding, adhesives, and/or the like.

The base plate 56 defines a generally hemispherical profile extending between an upper portion 56a and an opposite, lower portion 56b, although any suitable profile is contemplated. The upper and lower portions 56a, 56b define a throughbore 56c therethrough configured to receive a portion of the screw assembly 60 therein, as will be described in further detail hereinbelow. The lower portion 56b of the base plate 56 is configured to be selectively coupled to a portion of the motor 58.

The screw assembly 60 includes a screw 62 having a threaded outer surface extending between an upper portion 62a and an opposite, lower portion 62b and a support bearing assembly 64 configured to rotatably support the screw 62 therein. It is contemplated that the screw may be any suitable type of screw capable of converting rotational motion into linear motion, such as a lead screw, ball screw, power screw, screws having conventional thread forms (UNC, UNF, ACME, and/or the like), among others. The lower portion 62b of the screw 62 is configured to be selectively coupled to an output shaft 58a of the motor 58 such that rotation of the output shaft causes a corresponding rotation of the screw 62. It is contemplated that the output shaft 58a of the motor 58 may be selectively coupled to the lower portion 62b of the shaft using any suitable means, such as a socket, a rigid coupling, or a flexible coupling, among others.

The support bearing assembly 64 is configured to be selectively coupled to the upper portion 56a of the base plate 56 and a portion of the support bearing 64 is configured to be received within the throughbore 56c. The support bearing assembly 64 is configured to rotatably support and translatably fix the screw 62 therein such that the screw 62 is supported by the support bearing assembly 64 in a fixed-free configuration, although any suitable configuration capable of supporting the screw 62 is contemplated. In this manner, the support bearing assembly 64 permits the output shaft 58a of the motor 58 to cause the screw 62 to rotate while inhibiting axial translation of the screw 62 along its longitudinal axis.

The shuttle 70 defines a generally cone shaped profile having an outer surface 70c extending between a generally planar lower surface 70a and a tip 70b disposed opposite thereto. Although generally shown as having a pointed configuration, it is contemplated that the tip 70b may define any suitable configuration, such as a conical frustum having a generally blunt tip, and/or the like. A gasket or seal 76 is disposed on the outer surface 70c, and in embodiments, may be interposed between an upper portion and a lower portion of the shuttle 70, depending upon the design needs of the shuttle 70. The seal 76 is configured to abut a portion of the lower portion 52a of the inlet tube 52 when the valve assembly 50 is placed in a closed position such that air or other fluids are inhibited from entering or exiting the inlet tube 52. It is contemplated that the seal 76 may be any suitable seal, such as an energized seal (e.g., with a coil spring), oil seal, o-ring, and/or the like, and may be constructed from any suitable material. In one non-limiting embodiment, the seal 76 is an energized teflon seal. Although generally illustrated as being constructed of two portions (e.g., an upper portion selectively coupled to a lower portion), it is contemplated that the shuttle 70 may be constructed as a monolithic structure (e.g., one piece) or from any number of suitable portions.

The cone shaped profile of the shuttle 70 enables the air flowing over the outer surface 70c of the shuttle 70 and into the bore 52c of the inlet tube 52 to remain substantially laminar (e.g., minimal turbulence), and if separation occurs, enables the separated air to re-converge before entering the impeller 44 of the diffuser 30, thereby reducing the amount of turbulent air reaching the impeller 44 and decreasing friction. As can be appreciated, air delivered to the impeller 44 in a substantially laminar state increases efficiency of the impeller 44 and decreases wear on the impeller 44 and any ancillary components. Depending upon the design needs of the valve assembly 50, it is contemplated that the angle at which the outer surface is arranged relative to a longitudinal axis X-X extending through the tip 70b and the lower surface 70a may vary.

The outer surface 70c of the shuttle 70 defines a fin or protrusion 72 thereon adjacent the tip 70b and extending longitudinally therefrom, although it is contemplated that the shuttle 70 may not include a fin. Although generally illustrated as having a planar configuration, it is contemplated that the fin 72 may include any suitable configuration, such as cylindrical, oval, or rectangular, among others.

A channel 70d is defined through the outer surface 70c and the lower surface 70a of the shuttle 70 and is disposed at an outer perimeter thereof. The channel 70d is configured to slidably receive a portion of the spacer block 54 such that the shuttle 70 is permitted to translate axially along the longitudinal axis X-X but not rotate thereabout. It is contemplated that the number of channels 70*d* defined in the shuttle 70 may correspond to the number of spacer blocks 54.

The planar lower surface 70*a* of the shuttle 70 defines a counterbore 70*e* therein terminating at an inner surface 70*f*. The counterbore 70*e* is configured to enable the planar lower surface 70*a* to abut the upper portion 56*a* of the base plate 56. In this manner, the counterbore 70*e* is configured to receive a portion of the support bearing assembly 64 therein. The inner surface 70*f* of the shuttle 70 defines a threaded bore 70*g* therein that is configured to threadably engage the screw 62 of the screw assembly 60. Although generally illustrated as being a blind hole, it is contemplated that the threaded bore 70*g* may be a through hole, depending upon the design needs of the valve assembly 50. The threaded bore 70*g* is dimensioned such that the screw 62 remains threadably engaged therewith when the shuttle 70 is placed in a fully closed position (e.g., the shuttle 70 is placed in a spaced apart relationship with the base plate 56) and when the shuttle 70 is placed in a fully open position (e.g., the shuttle 70 is placed in an approximated relationship with the base plate 56) the screw 62 is received therein without bottoming out or protruding through the outer surface 70*c* thereof. In embodiments, the threaded bore 70*g* may be unthreaded and configured to receive a threaded insert (not shown) or other suitable insert having a threaded inner bore capable of threadably engaging the screw 62.

The threaded bore 70*g* of the shuttle 70 and the screw 62 cooperate such that rotation of the screw 62 in a first direction causes the shuttle 70 to translate along the longitudinal axis X-X towards the base plate 56 (e.g., to open the valve assembly) and rotation of the screw 62 in a second, opposite direction causes the shuttle 70 to translate along the longitudinal axis X-X away from the base plate (e.g., to close the valve assembly). As can be appreciated, the motor 58 is utilized to control the direction of rotation of the screw 62 and the amount of rotation of the screw 62, as will be described in further detail hereinbelow.

The valve assembly 50 includes a motor housing 74 having a generally hemispherical profile, although any suitable profile is contemplated. The motor housing 74 defines a first, surface 74*a* and a second surface 74*b* disposed opposite thereto. Although generally illustrated as having a planar configuration, it is contemplated that the first and second surfaces 74*a*. 74*b* may include any suitable profile, such as concave or convex, among others. The first surface 74*a* defines a cavity 74*c* therein that is configured to receive a portion of the motor 58 therein. The second surface 74*b* defines an aperture 74*d* that is configured to permit passage of wires, cables, and/or the like. The first surface 74*a* of the motor housing 74 is configured to abut the lower portion 56*b* of the base plate 56 to enclose the motor 58 therein to provide protection against intrusion or ingress of moisture, dust, or other contaminants, although it is contemplated that the motor housing 74 may permit the ingress and egress of water, dust, and/or other material. It is contemplated that the motor housing 74 may be coupled to the base plate 56 using any suitable means, such as fasteners, adhesives, friction fit, or welding, among others.

As can be appreciated, the various components of the valve assembly 50 may be formed from any suitable material suitable for use in high altitude conditions, such as metallic materials (e.g., steel, aluminum, magnesium, and/or the like) or non-metallic materials (e.g., polymers, ceramics, composites, and/or the like), among others depending upon the design needs of the valve assembly 50.

Figure 8:
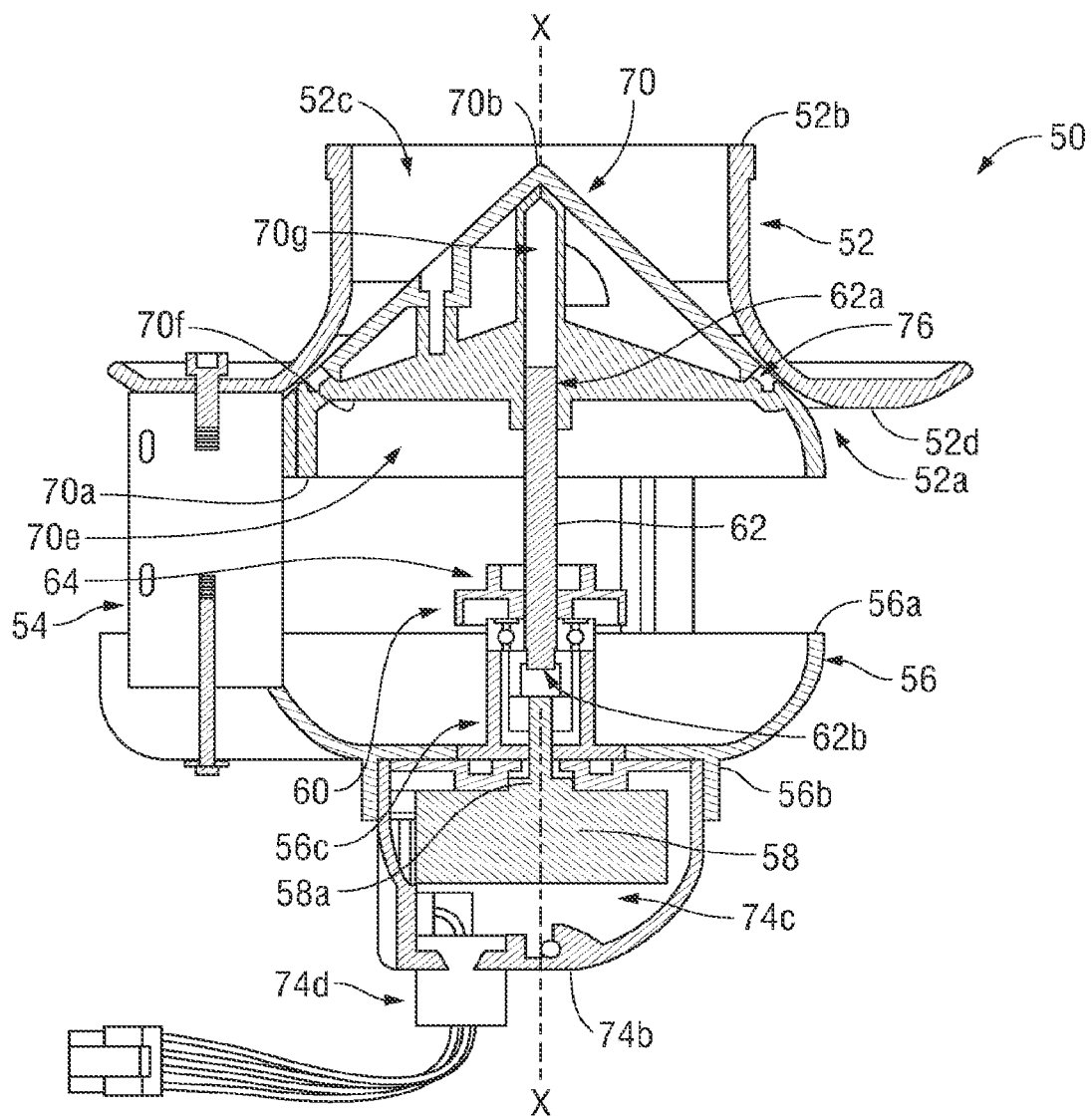
FIG. 8 is a cross-sectional view of the valve assembly of FIG. 7 taken along section-line FIG. 8-FIG. 8 of FIG. 7.
Figure 9:
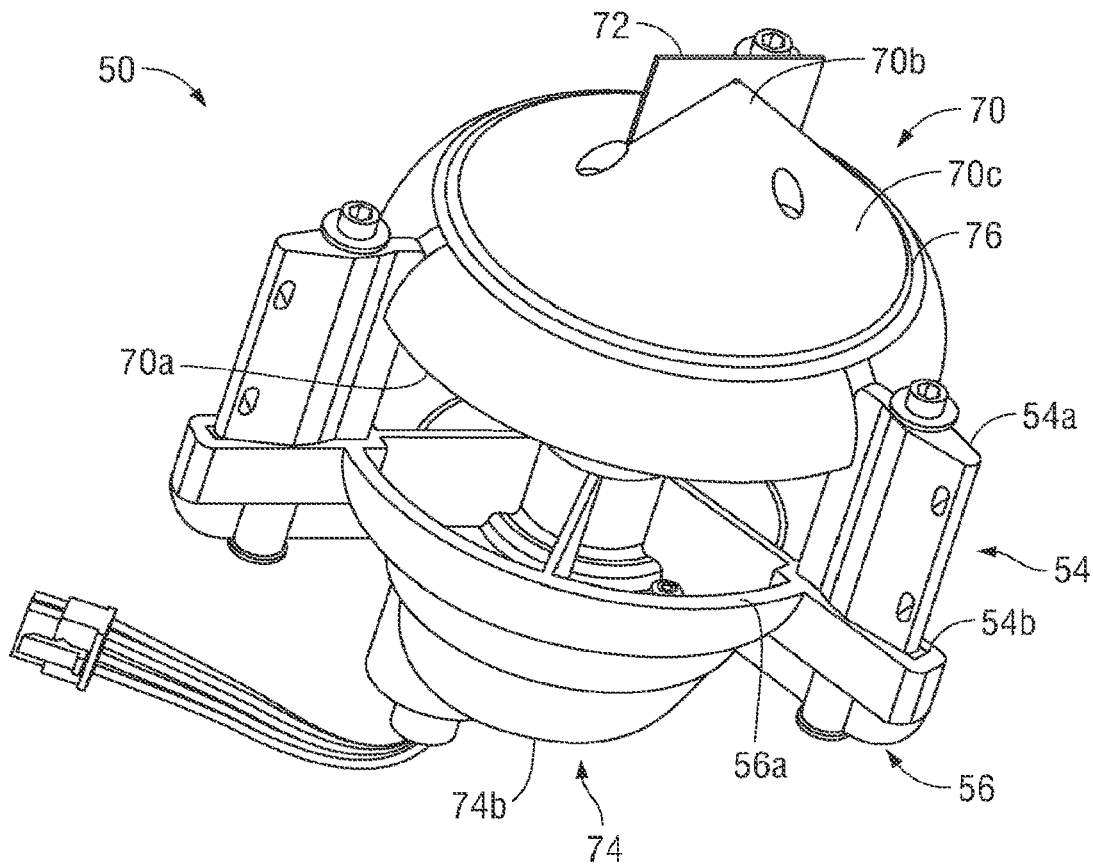
FIG. 9 is a top, perspective view of the valve assembly of FIG. 7 shown with an intake shroud of the valve assembly of FIG. 7 removed.
Figure 10:
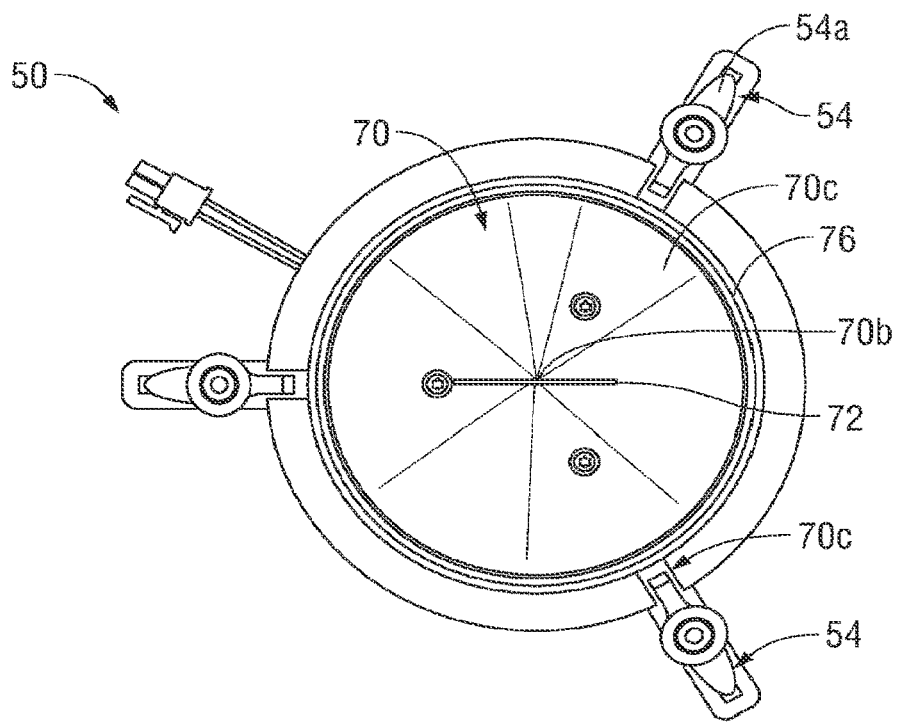
FIG. 10 is a top view of the valve assembly of FIG. 7 shown with an intake shroud of the valve assembly of FIG. 7 removed.
Figure 11:
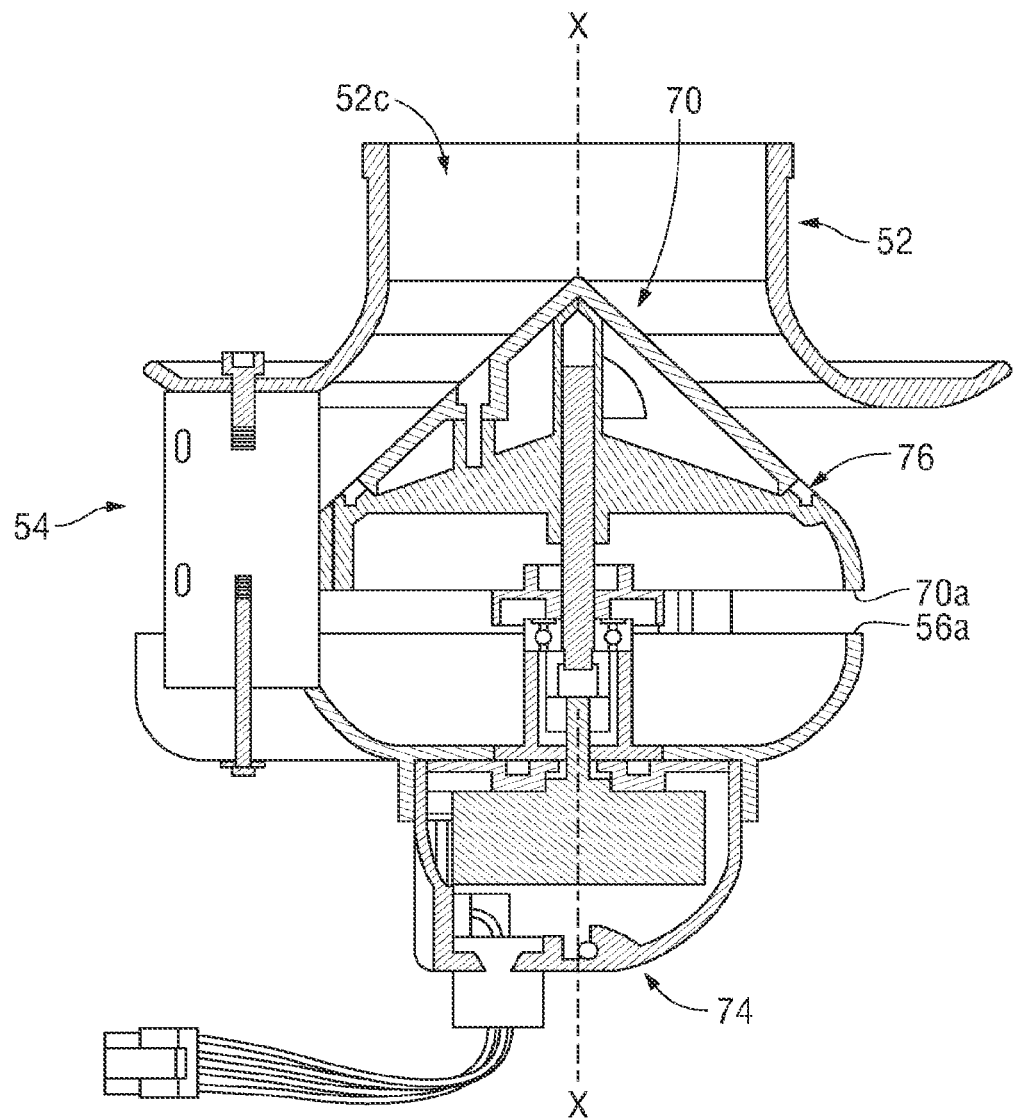
FIG. 11 is a cross-sectional view of the valve assembly of FIG. 7 taken along section-line FIG. 8-FIG. 8 of FIG. 7 and shown with a shuttle of the valve assembly in a fully open position.
Figure 12:
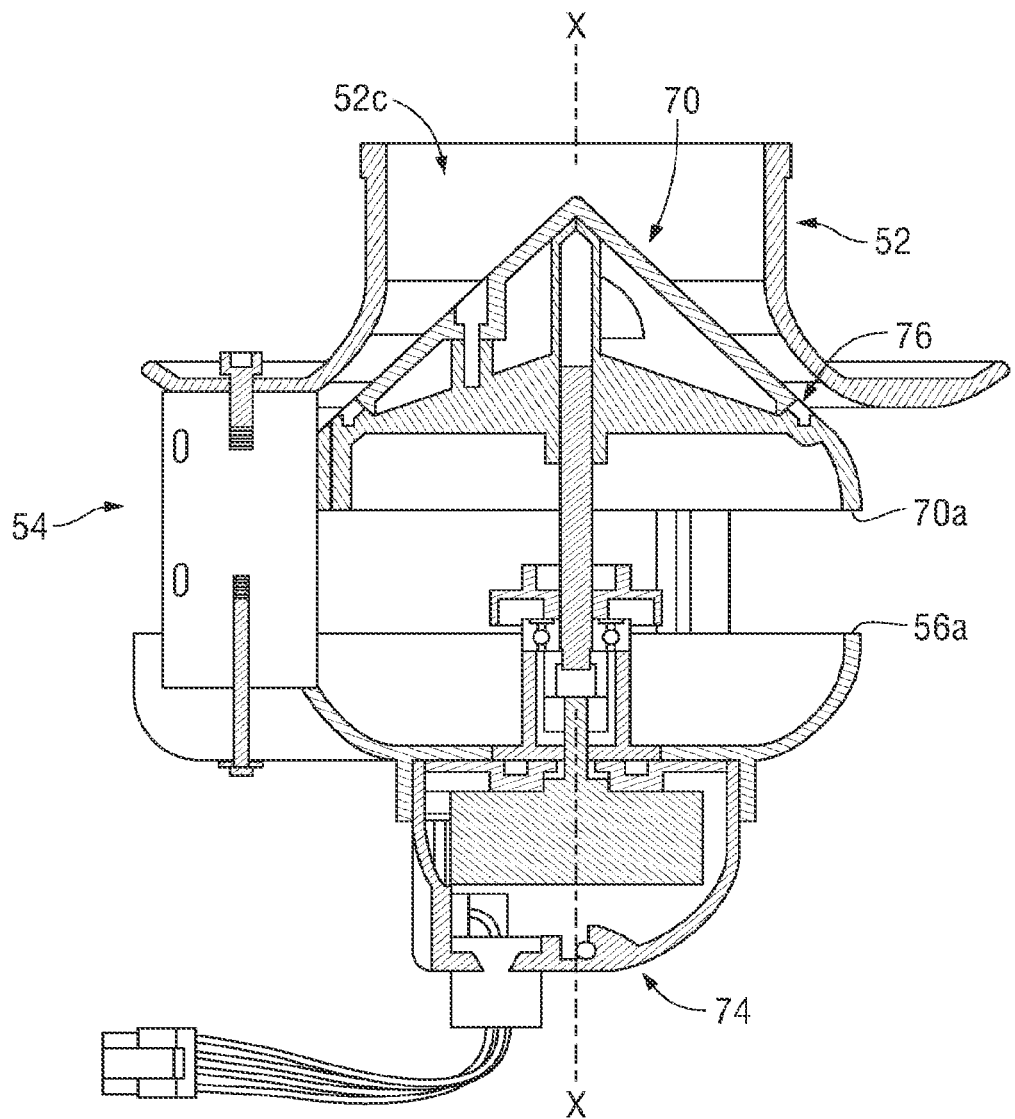
FIG. 12 is a cross-sectional view of the valve assembly of FIG. 7 taken along section-line FIG. 8-FIG. 8 of FIG. 7 and shown with the shuttle of the valve assembly in a partially open position.

Referring to FIGS. 8, 11, and 12, in operation, the shuttle 70 may be translated from an initial, closed position (e.g., where the seal 76 abuts a portion of the lower portion 52*a* of the inlet tube 52) where air or other fluids are inhibited from entering or exiting the inlet tube 52 (FIG. 8) to an open position where a gap is formed between the outer surface 70*c* of the shuttle 70 and the lower portion 52*a* of the inlet tube 52 such that air or other fluids are able to enter or exit the inlet tube 52 (FIGS. 11 and 12). As can be appreciated, the shuttle 70 may be placed in any position between the upper portion 56*a* of the base plate 56 and the lower portion 52*a* of the inlet tube 52 to increase or decrease the amount of air or other fluid flowing into or out of the inlet tube 52.

To cause the unmanned aerial vehicle 10 to ascend, the motor 58 is caused to rotate in a first direction, which in turn, causes the screw 62 to rotate in a corresponding first direction and draw the shuttle 70 towards the base plate 56. As the seal 76 of the shuttle 70 is separated from the lower portion 52*a* of the inlet tube 52, air or other fluid within the ballonet 16 is permitted to exit and flow through the plenum 30*d*, through the inlet tube 52, and over and past the outer surface 70*c* of the shuttle 70 of the valve assembly 50. In embodiments, the air or other fluid may be drawn or forced out of the ballonet 16 using the impeller 44, internal superpressure of the balloon, or other suitable means. As the air or other fluid within the ballonet 16 is removed, the mass of the air or fluid within the ballonet 16 is reduced. As such, the buoyancy of the balloon 12 is increased, thereby causing the unmanned aerial vehicle 10 to ascend.

Once the desired altitude is reached, the motor is caused to be rotated in a second, opposite direction such that the shuttle 70 is pushed towards the lower portion 52*a* of the inlet tube 52 until the seal 76 abuts the lower portion 52*a* to inhibit air from entering or exiting the inlet tube 52.

As can be appreciated, if the flow of air or other fluid from the ballonet 18 and through the inlet tube 52 is too great (e.g., the mass of air being ejected is too great), the unmanned aerial vehicle 10 is unable to ascend quickly enough to keep up with the increased buoyancy of the balloon 12 due to aerodynamic forces acting upon the balloon 12. This may result in the balloon 12 losing superpressure (e.g., an under pressurization effect), thereby causing uneven stress on the balloon 12 which can result in premature failure of the balloon 12.

To alleviate this issue, the motor 58 is configured to place the shuttle 70 to be placed at various locations between the upper surface 56*a* of the base plate 56 and the lower portion 52*a* of the inlet tube 52 to effectively throttle the amount of air that is permitted to be ejected from the ballonet 16. For example, the shuttle 70 may be drawn towards the base plate 56 approximately 20% of its travel by causing the motor 58 to rotate in a first direction such that the unmanned aerial vehicle 10 rises at a corresponding 20% of its possible ascent rate. As can be appreciated, the position of the shuttle 70 can be altered by rotating the motor 58 in a first direction to draw the shuttle 70 towards the base plate 56 or rotating the motor 58 in a second, opposite direction to push the shuttle 70 towards the inlet tube 52. As such, the flow of air through the inlet tube 52 may be "throttled" depending upon the rate of ascent or descent required. This "throttling" enables the unmanned aerial vehicle 10 to ascend more slowly to reduce the stress placed upon the balloon 12, reduce damage to the balloon 12 from flapping in the wind, and intercept a targeted wind stream at a particular point in time.

Similarly, descending too quickly can cause an over pressurization effect on the balloon 12. In this manner, if the impeller 44 draws air into the ballonet 16 through the inlet tube 52 at too great a rate, the mass of the balloon 12 exceeds the unmanned aerial vehicles 10 ability to descend and maintain neutral buoyancy due to aerodynamic forces acting upon the balloon 12. As can be appreciated, the ability to place the shuttle 70 in any suitable position between the upper surface 56a of the base plate 56 and the lower portion 52a of the inlet tube 52 enables "throttling" of the air being drawn into the ballonet 16 thereby enabling the descent rate to match the aerodynamic drag acting upon the balloon 12. As can be appreciated, "throttling" the air transferred between the ballonet 16 and the surrounding atmosphere enables ascending and descending to be more efficient, reducing the amount of power being drawn from batteries or other energy sources (not shown) to cause the unmanned aerial vehicle 10 to ascend or descend.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A valve assembly for controlling an altitude of an unmanned aerial vehicle, comprising:
   an inlet tube extending between first and second end portions;
   a shuttle partially disposed within the inlet tube, wherein the shuttle is configured to be placed in a first position where an outer surface of the shuttle abuts a portion of the inlet tube and a second position where the outer surface of the shuttle is disposed in spaced relation to the inlet tube;
   a base plate extending between first and second end portions, the first portion of the base plate defining a cavity therein;
   a screw assembly disposed within the cavity of the base plate, wherein a portion of the screw assembly is coupled to a portion of the shuttle; and
   a spacer block interposed between the second end portion of the inlet tube and the rust end portion of the base plate, the spacer block configured to maintain the inlet tube and the base plate in spaced relation to one another.

* * * * *